(12) United States Patent
Matsuo et al.

(10) Patent No.: US 9,759,847 B2
(45) Date of Patent: Sep. 12, 2017

(54) OPTICAL FILTER

(71) Applicant: ASAHI GLASS COMPANY, LIMITED, Chiyoda-ku (JP)

(72) Inventors: Atsushi Matsuo, Chiyoda-ku (JP); Satoshi Umeda, Chiyoda-ku (JP); Tsutomu Kinashi, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 278 days.

(21) Appl. No.: 14/548,890

(22) Filed: Nov. 20, 2014

(65) Prior Publication Data
US 2015/0077841 A1 Mar. 19, 2015

Related U.S. Application Data

(63) Continuation of application No. PCT/JP2013/070432, filed on Jul. 29, 2013.

(30) Foreign Application Priority Data

Aug. 3, 2012 (JP) ................................. 2012-173319

(51) Int. Cl.
*G02B 5/20* (2006.01)
*G02B 5/00* (2006.01)
*G03B 11/00* (2006.01)

(52) U.S. Cl.
CPC ............. *G02B 5/208* (2013.01); *G02B 5/005* (2013.01); *G02B 5/205* (2013.01); *G03B 11/00* (2013.01)

(58) Field of Classification Search
CPC . G02B 5/20; G02B 5/208; G02B 5/22; G02B 5/223; G02B 5/226; G02B 5/26
(Continued)

(56) References Cited

U.S. PATENT DOCUMENTS

2002/0029704 A1 3/2002 Tagami
2003/0160946 A1 8/2003 Yamanaka
(Continued)

FOREIGN PATENT DOCUMENTS

CN 1467524 A 1/2004
CN 1790069 A 6/2006
(Continued)

OTHER PUBLICATIONS

International Preliminary Report on Patentability and Written Opinion issued Feb. 12, 2015 in PCT/JP2013/070432.
(Continued)

*Primary Examiner* — Scott J Sugarman
*Assistant Examiner* — Robert E Tallman
(74) *Attorney, Agent, or Firm* — Oblon, McClelland, Maier & Neustadt, L.L.P.

(57) ABSTRACT

Provided is an optical filter integrally provided with a light blocking film capable of suppressing stray light. An optical filter may be used for an imaging apparatus having a built-in image sensing device on which light from a subject or a light source is incident. The optical filter includes: an optical filter main body arranged between the subject or the light source and the image sensing device and having a transmission property for the incident light; and a frame-shaped light blocking film integrally formed on at least one surface of the optical filter main body. The light blocking film satisfies the following condition (1) and/or condition (2). (1) A concavity/convexity is formed on at least a part of an inner peripheral surface of the light blocking film. (2) A thin part is formed on at least a part of an inner edge of the light blocking film.

20 Claims, 11 Drawing Sheets

(58) Field of Classification Search
USPC .............. 359/350, 352, 353, 355, 359–361
See application file for complete search history.

(56) References Cited

U.S. PATENT DOCUMENTS

| | | | |
|---|---|---|---|
| 2006/0121392 A1 | 6/2006 | Nakatsugawa | |
| 2007/0154207 A1 | 7/2007 | Saito et al. | |
| 2008/0266691 A1 | 10/2008 | Kaihoko et al. | |
| 2009/0190071 A1 | 7/2009 | Kubota et al. | |
| 2013/0175650 A1* | 7/2013 | Gleason ............ | H01L 27/14618 257/434 |

FOREIGN PATENT DOCUMENTS

| | | |
|---|---|---|
| CN | 101008763 A | 8/2007 |
| JP | 56-085968 | 7/1981 |
| JP | 2002-042551 A | 2/2002 |
| JP | 2002-268120 | 9/2002 |
| JP | 2003-248107 | 9/2003 |
| JP | 2006-259048 | 9/2006 |
| JP | 2007-178823 | 7/2007 |
| JP | 2008-070827 | 3/2008 |
| JP | 2009-175531 A | 8/2009 |
| JP | 2009-222735 A | 10/2009 |
| JP | 2009-244529 | 10/2009 |
| JP | 2010-175749 A | 8/2010 |
| JP | 2011-170391 | 9/2011 |
| JP | 2013-207035 | 10/2013 |
| JP | 6008436 B | 10/2016 |
| WO | WO 2013/061990 A1 | 5/2013 |
| WO | WO 2016/121724 A1 | 8/2016 |

OTHER PUBLICATIONS

Combined Chinese Office Action and Search Report issued Apr. 23, 2015 in Patent Application No. 201380001236.0 (with English translation of categories of cited documents).
International Search Report issued in PCT/JP2013/070432, dated Aug. 20, 2013.
Office Action dated Jun. 20, 2017, in Japanese Patent Application No. 2013-543437 (w/ English translation).

* cited by examiner

OPTICAL FILTER

CROSS-REFERENCE TO RELATED APPLICATIONS

This application is a continuation of prior International Application No. PCT/JP2013/070432, filed on Jul. 29, 2013 which is based upon and claims the benefit of priority from Japanese Patent Application No. 2012-173319 filed on Aug. 3, 2012; the entire contents of all of which are incorporated herein by reference.

FIELD

An embodiment of the present invention relates to an optical filter.

BACKGROUND

In an imaging apparatus using a solid-state image sensing device such as a CCD (Charge Coupled Device) or a CMOS (Complementary Metal Oxide Semiconductor) image sensor, an optical filter having various optical functions is arranged, for example, between an imaging lens and the solid-state image sensing device so as to successfully reproduce a color tone and obtain a clear image. Its typical example is a near-infrared cut filter, which blocks light in a near infrared wavelength region so as to correct the spectral sensitivity of the solid-state image sensing device to the visibility of human, and is normally arranged between the imaging lens and the solid-state image sensing device Further, in the imaging apparatus, a blocking member that is a so-called diaphragm is arranged to adjust the amount of light incident thereon to thereby avoid a situation that the image sensing device cannot perform imaging any longer because of saturation of electric charges generated due to light reception, or to cut stray light due to reflection or scattering from an optical member such as a lens or a sensor, or a holding member therefore in the imaging apparatus.

In recent years, the imaging apparatus using the solid-state image sensing device is increasingly downsized and becomes to be installed in a small electronic device such as a cellular phone. Thus, the need for downsizing and higher functionality of the electronic device itself is increased recently, along with which the imaging apparatus is also required to be further downsized.

As a method of realizing the downsizing the imaging apparatus, for example, a method of integrally providing a black coating (light blocking film) functioning as a light blocking member at the optical filter is known. In this method, a space for arranging the diaphragm becomes unnecessary, leading to downsizing of the device. In addition, the number of parts can be reduced and simplification of assembly process can be achieved accordingly.

However, in the optical filter integrally provided with the black coating as described above, a phenomenon that light is diffracted near a boundary between the black coating and an opening portion transmitting the light arises, so that unnecessary light is incident on the image sensing device to degrade the image quality in some cases.

An object of the present invention is to provide an optical filter excellent in productivity and economic efficiency and integrally provided with a light blocking film capable of suppressing stray light causing image degradation.

An optical filter according to an aspect of the present invention is an optical filter used for an imaging apparatus having a built-in image sensing device on which light from a subject or a light source is incident, the optical filter including: an optical filter main body arranged between the subject or the light source and the image sensing device and having a transmission property for the incident light; and a frame-shaped light blocking film integrally formed on at least one surface of the optical filter main body, wherein the frame-shaped light blocking film satisfies the following condition (1) and/or condition (2).

(1) A concavity/convexity is formed on at least a part of an inner peripheral surface of the frame-shaped light blocking film in planar view.

(2) A thin part is formed on at least a part of an inner edge of the frame-shaped light blocking film.

According to the present invention, an optical filter excellent in productivity and economic efficiency and integrally provided with a light blocking film capable of suppressing stray light causing image degradation can be provided.

DETAILED DESCRIPTION

Figure 1:
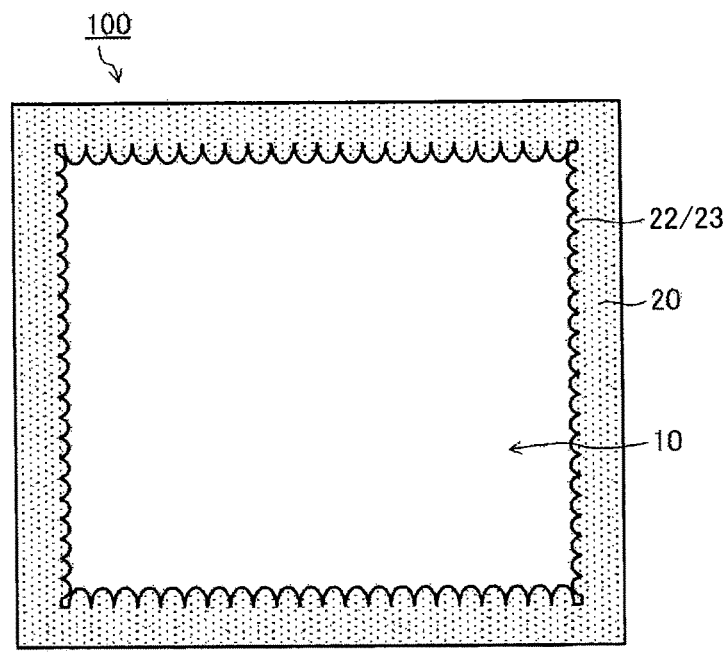
FIG. 1 is a plan view illustrating an optical filter in an embodiment of the present invention.

Hereinafter, an embodiment of the present invention will be described. Note that the description will be presented based on the drawings, which are provided for illustration, and the present invention is not limited by those drawings. Further, the same numerals are given to common parts in the drawings.

Figure 2:
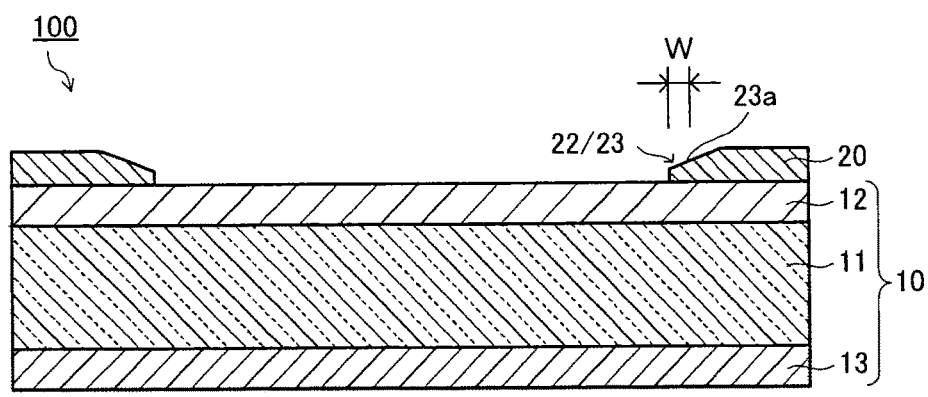
FIG. 2 is a cross-sectional view of the optical filter illustrated in FIG. 1.

FIG. 1 is a plan view schematically illustrating a near-infrared cut filter according to an embodiment of the present invention, and FIG. 2 is a cross-sectional view of the same.

As illustrated in FIG. 1 and FIG. 2, a near-infrared cut filter 100 includes a near-infrared cut filter main body (hereinafter, also simply referred to as a "filter main body") 10, and a frame-shaped light blocking film (hereinafter, also simply referred to as a "light blocking film") 20 integrally formed with one principal surface thereof.

The filter main body 10 has a transparent substrate 11, an ultraviolet and infrared light reflective film 12 composed of a dielectric multilayered film that is formed on one principal surface of the transparent substrate 11 and transmits light in a visible wavelength region but reflects light in an ultraviolet wavelength region and an infrared wavelength region, and an antireflection film 13 formed on the other principal surface of the transparent substrate 11.

The light blocking film 20 is formed of a light blocking resin containing an inorganic or organic coloring agent such as carbon black, or titanium black on the principal surface of the filter main body 10 on the ultraviolet and infrared light reflective film 12 side. The kind of the resin is not particularly limited but any of a light curing resin, which is cured by being irradiated with light in the ultraviolet wavelength region or the like, a thermoplastic resin, and a thermosetting resin is usable. Herein, the word "light blocking property" means a property of blocking transmission of light by mainly absorbing light. The light blocking film 20 made of the resin having the light blocking property functions as a so-called diaphragm that adjusts the amount of light incident on an image sensing device or cuts stray light when the near-infrared cut filter 100 in this embodiment is used in a later-described imaging apparatus having a built-in image sensing device.

The frame-shaped light blocking film 20 has a fine concavity/convexity 22 formed on its inner peripheral surface and a thin part 23 formed along the inner peripheral surface. The concavity/convexity 22 and the thin part 23 have an action of suppressing a phenomenon that light is diffracted near a boundary between the light blocking film 20 and an opening portion which transmits the light to form into stray light to thereby adversely affect an image, which is a conventional problem. Note that only one of the concavity/convexity 22 and the thin part 23 may be provided.

Here, a light diffraction suppressing effect by the concavity/convexity 22 and the thin part 23 will be described.

Figure 3:
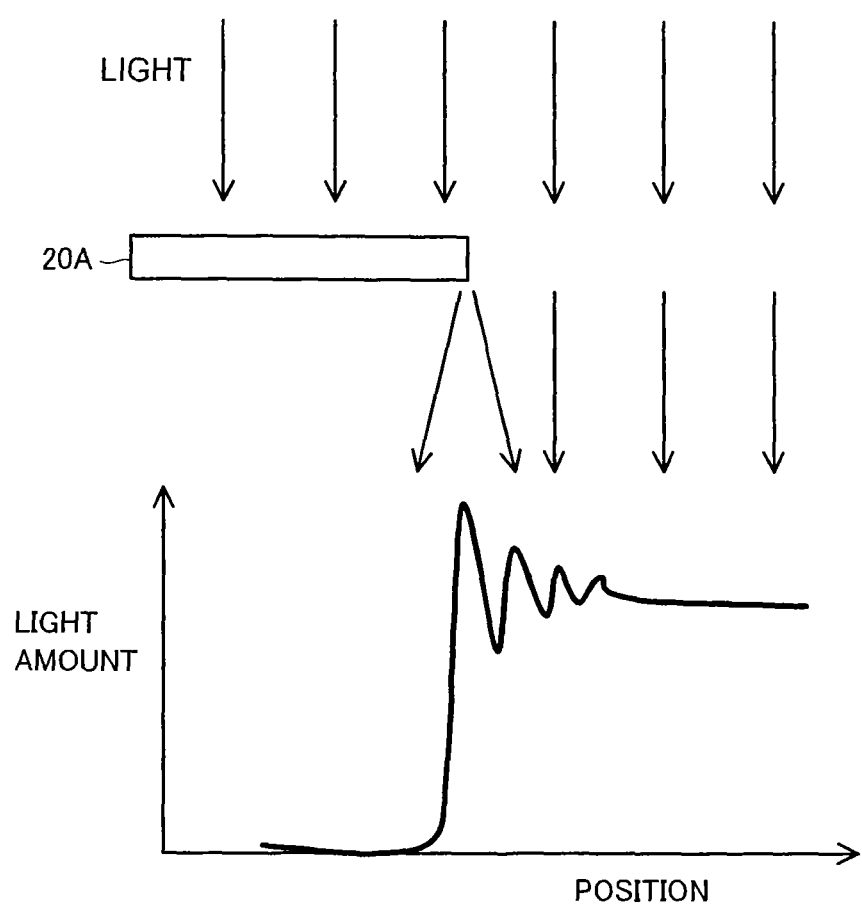
FIG. 3 is a cross-sectional view for explaining a diffraction suppressing effect by the optical filter illustrated in FIG. 1.

FIG. 3 is a view schematically illustrating light transmission in a conventional light blocking film 20A and near there, and the amount of transmitted light, in the case where light is made incident on a near-infrared cut filter provided with the conventional light blocking film 20A in which the concavity/convexity 22 and the thin part 23 are not formed. Besides, FIG. 4 is a view schematically illustrating light transmission in the light blocking film 20 and near there, and the amount of transmitted light, in the case where light is made incident on the near-infrared cut filter 100 provided with the light blocking film 20 in which the concavity/convexity 22 and the thin part 23 as illustrated in FIG. 1 are formed.

As illustrated in FIG. 3, in the case of the conventional-type near-infrared cut filter, light is diffracted at an inner edge of the light blocking film 20A or near there, and the light intensity is distributed on an imaging plane of the image sensing device which has received the light, resulting in degradation in quality at a peripheral portion of an image. In contrast, in the case of the near-infrared cut filter in this embodiment, light is diffracted at an inner edge of the light blocking film 20, but the diffracted lights are multiplexed on the imaging plane of the image sensing device so that the light intensity becomes uniform as illustrated in FIG. 4. Therefore, an image where stray light is substantially difficult to recognize can be obtained. Besides, there arises a region where the diffracted lights reinforce each other in a direction parallel to the inner edge of the light blocking film 20A in the conventional-type near-infrared cut filter, whereas there hardly arises a region where diffracted lights reinforce each other because directions of the diffracted lights diffuse in the near-infrared cut filter in this embodiment.

Figure 4:
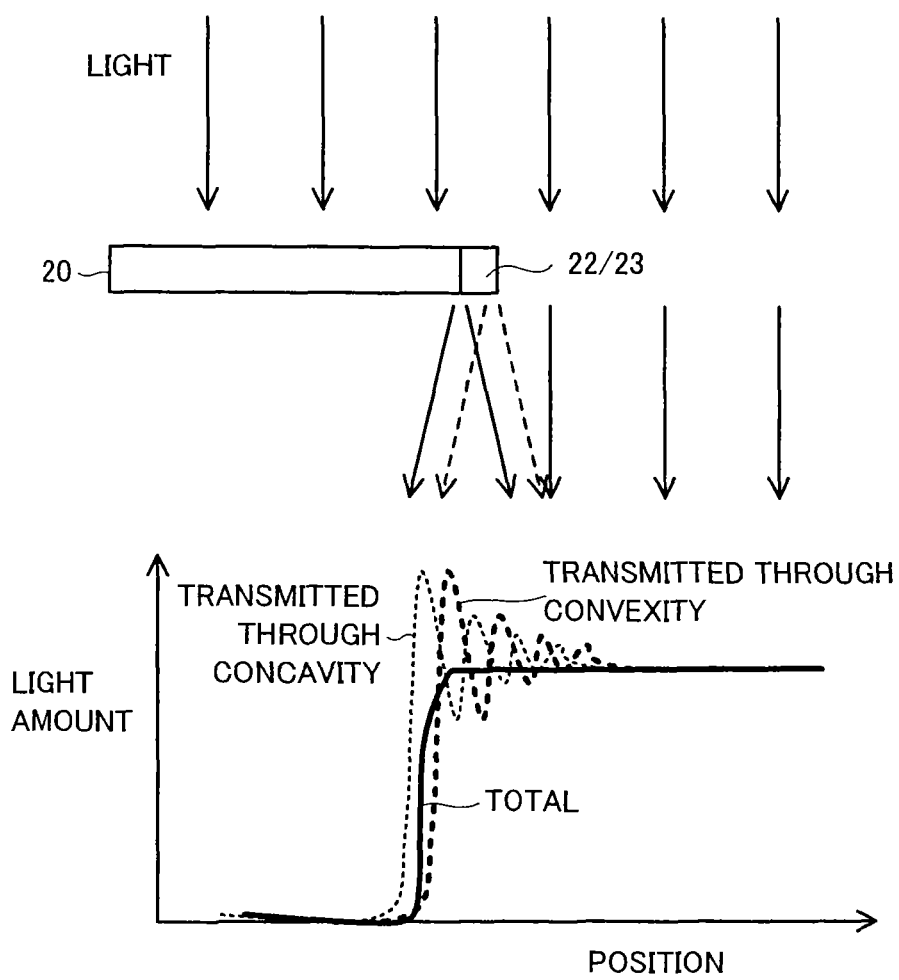
FIG. 4 is a cross-sectional view for explaining the diffraction suppressing effect by the optical filter illustrated in FIG. 1.

Note that in FIG. 3 and FIG. 4, arrows indicate light ray directions of the light incident in a direction of the cross-section of the light blocking film 20A or the light blocking film 20, but not only the light vertically incident on the light blocking film 20 but also light diagonally incident and light reflected in the imaging apparatus and deviated from a predetermined optical path are incident on the imaging plane of the actual image sensing device, resulting in a more complicated state.

The thin part 23 absorbs or reflects light at an inner edge portion of the light blocking film 20 to inhibit light from being incident on the image sensing device. Further, the thin part 23 slightly transmits light. The transmission of slight amount of light makes it possible to prevent diffracted lights from the inner edge of the light blocking film 20 from reinforcing each other on the image sensing device.

To achieve the above-described light diffraction suppressing effect, the concavity/convexity 22 and the thin part 23 in the light blocking film 20 preferably satisfy at least one of the following conditions.

(a) The concavity/convexity 22 is irregular. Herein, that "the concavity/convexity is irregular" means that the concavity/convexity has no regularity or less regularity in shape, size, pitch, arrangement direction and so on in planar view of the light blocking film 20 (the concavity/convexity 22 when described hereinafter is the concavity/convexity in planar view of the light blocking film 20, unless otherwise stated). This is because if the concavity/convexity has regularity, there may arise a point or a line where the diffracted lights reinforce each other on the image sensing device, causing a possibility that the above-described diffraction suppressing effect cannot be sufficiently achieved. The regularity as low as possible is preferable, and no regularity is more preferable. Particularly, it is preferable that the concavity/convexity is irregular in height of a convexity (or depth of a concavity) and pitch, namely, a formation interval between adjacent convexities (or concavities).

Figure 5:
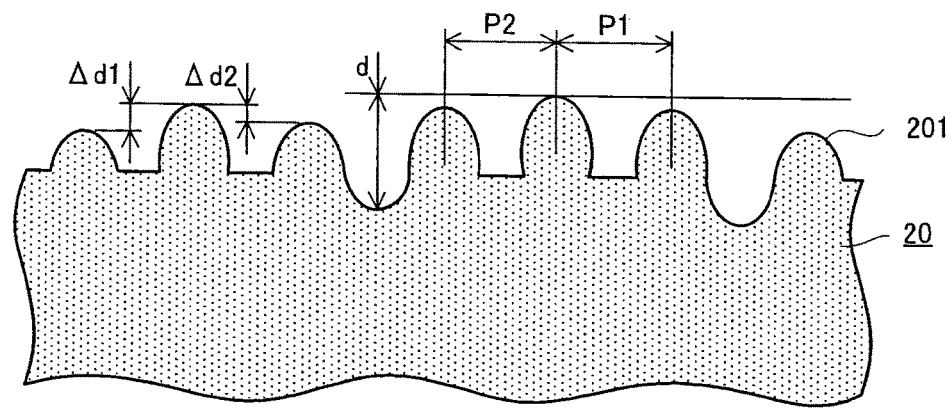
FIG. 5 is a plan view illustrating the optical filter illustrated in FIG. 1 with an essential part enlarged.

More specifically, for example, when focusing the convexity, it is preferable that at least two convexities 201 are different in height, namely, differences $\Delta d1$, $\Delta d2$ each between heights of the adjacent two convexities 201 are positive as illustrated in FIG. 5. It is more preferable that $\Delta d1$, $\Delta d2$ are positive and $\Delta d1$ and $\Delta d2$ are different from each other, namely, $\Delta d1 \neq \Delta d2$. Besides, even if the heights of the adjacent two convexities 201 are the same, namely, the differences $\Delta d1$, $\Delta d2$ each between the heights of the adjacent two convexities 201 are zero, it is only necessary that pitches P1, P2 are different, namely, P1≠P2. It is more preferable that $\Delta d1$, $\Delta d2$ are positive and P1, P2 are in $\Delta d1 \neq \Delta d2$, and it is even more preferable that $\Delta d1$, $\Delta d2$ are positive, $\Delta d1 \neq \Delta d2$, and P1≠P2.

Further, regarding the pitches P1, P2, it is more preferable that their ratio P1/P2 is 1.1 or more, or 0.9 or less. It is even more preferable that the ratio P1/P2 is 1.4 or more, or 0.7 or less. Regarding Δd1, Δd2, Δd1/d is preferably 0.1 or more, and more preferably 0.3 or more. |Δd1−Δd2|/d is preferably 0.05 or more, and more preferably 0.1 or more. Herein, d is the maximum height of the convexity 201, namely, the height from the deepest valley to the highest peak of the concavity/convexity 22 in FIG. 5.

Figure 6A:
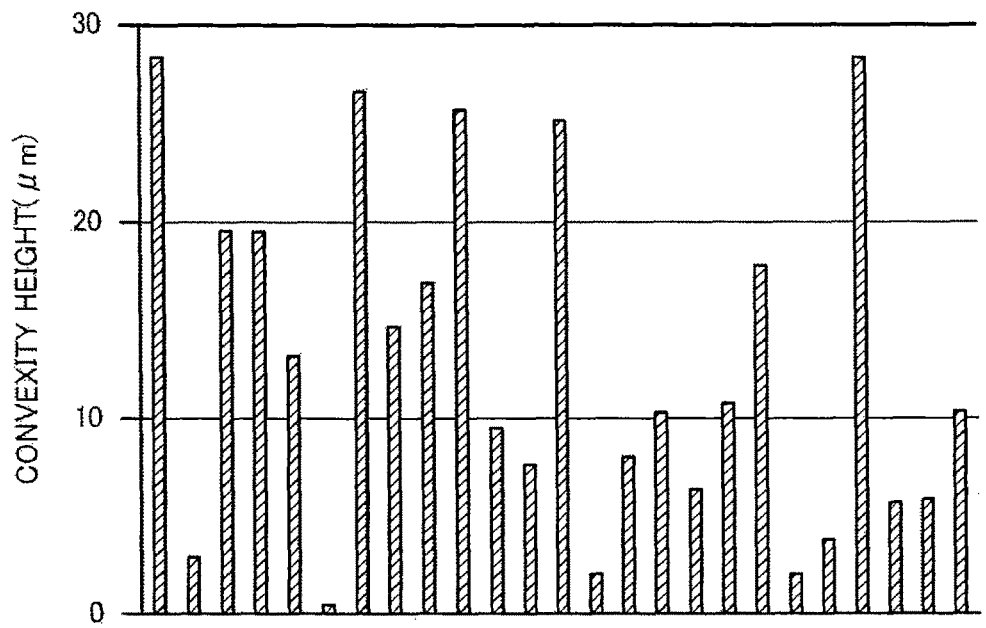
FIG. 6A is a graph indicating heights of convexities of a light blocking film measured in one example of the present invention.
Figure 6B:
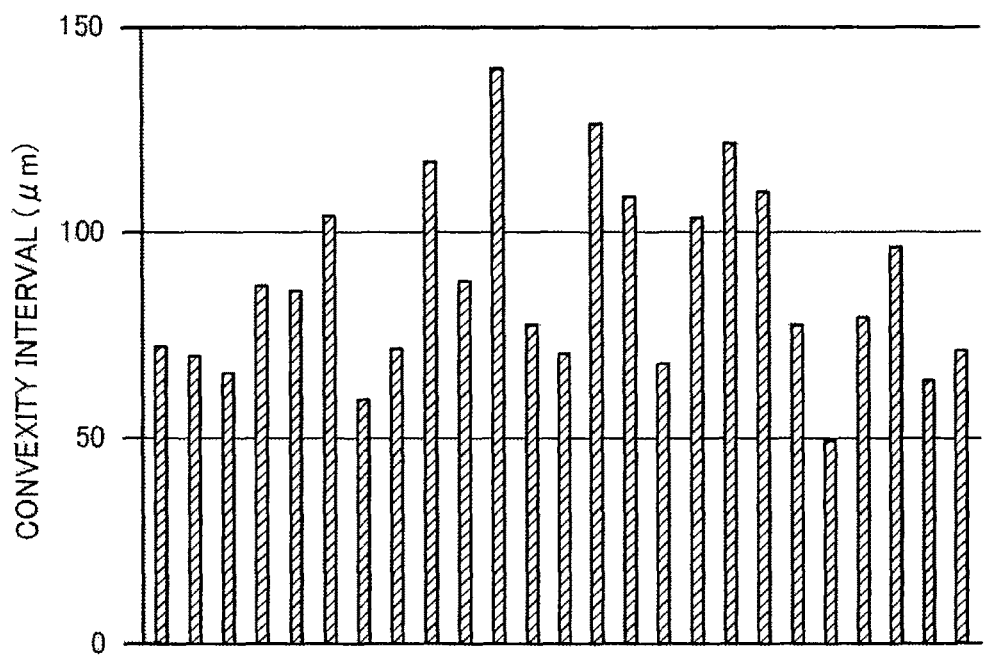
FIG. 6B is a graph indicating formation intervals (pitches) of the light blocking film measured in one example of the present invention.

FIG. 6A and FIG. 6B are graphs indicating the irregularity of the concavity/convexity 22 and actually measured values of the concavity/convexity 22 manufactured in later-described examples. FIG. 6A indicates heights of the convexities and FIG. 6B indicates their formation intervals (pitches).

(b) In the concavity/convexity 22, the height of the convexity 201 (or the depth of the concavity) is equal to or more than the wavelength of light transmitted through the near-infrared cut filter (for example, 0.4 μm or more for use in an image sensing device for visible light) and 50 μm or less. Setting the height of the convexity 201 (or the depth of the concavity) to equal to or more than the wavelength transmitted through the near-infrared cut filter makes it possible to further diffuse the diffracted light from the inner edge of the light blocking film 20. On the other hand, if the height of the convexity 201 (or the depth of the concavity) is too large, the function of diffusing the diffracted light decreases, causing a region where diffracted lights reinforce each other in a shape similar with the concavity/convexity on the image sensing device to decrease the diffraction suppressing effect. Setting the height of the convexity 201 (or the depth of the concavity) to 50 μm or less makes it possible to suppress the decrease in the diffraction suppressing effect. The height of the convexity 201 (or the depth of the concavity) is preferably about 0.5 μm being the wavelength of green light at which the visibility becomes maximum, or more and 10 μm or less in the case of use in the image sensing device for visible light.

(c) A light transmittance of the thin part 23 is 0.5% or more. Setting the light transmittance to 0.5% or more makes it possible to sufficiently prevent diffracted lights from the inner edge of the light blocking film 20 from reinforcing each other on the image sensing device. The light transmittance is preferably 1% or more, and more preferably 3% or more. On the other hand, when an average light transmittance of the thin part 23 exceeds 80%, the light blocking effect decreases, so that stray light is transmitted. Accordingly, the average light transmittance of the thin part 23 is preferably 80% or less, and more preferably 40% or less. The light transmittance of a portion other than the thin part 23 of the light blocking film 20 is preferably less than 0.5%, more preferably 0.2% or less, and even more preferably 0.1% or less.

(d) A width w of the thin part 23 having a light transmittance of 0.5% or more is 0.4 μm or more. Setting the width w to 0.4 μm or more achieves a higher diffraction suppressing effect. The width w is more preferably 1 μm or more, and even more preferably 4 μm or more. On the other hand, if the width w exceeds 50 μm, stray light is more likely to be transmitted. Accordingly, the width w of the thin part 23 is preferably 50 μm or less, and more preferably 20 μm.

In this embodiment, the thin part 23 has an inclined surface 23a that gradually decreases in thickness toward the edge. Provision of the inclined surface 23a is more preferable because the transmittance gradually increases toward the edge so that diffraction due to the stepwise change in transmittance is suppressed to sufficiently inhibit the diffracted lights from reinforcing each other on the image sensing device.

In this embodiment, in order to enhance the function of cutting stray light, it is preferable to form a matte surface-like concavity/convexity structure or provide an antireflection film on the surface of the light blocking film 20 (a surface opposite to the filter main body 10, namely, a surface on the light incident side) to thereby impart a light antireflection function.

In order to impart an excellent antireflection function, the matte surface-like concavity/convexity structure is preferably a structure in which the surface roughness of the surface of the light blocking film 20 formed with the concavity/convexity structure is 0.1 μm or more in terms of an arithmetic average roughness (Ra) measured by an atomic force microscope (AFM) in conformity with JIS B0601 (1994). A more preferable range of the arithmetic average roughness (Ra) is 0.15 to 10 μm, further preferably 0.2 to 2 μm, and much more preferably 0.2 to 0.5 μm. Besides, an average interval (S) between local peaks measured by an ultra-deep profile measurement microscope in conformity with HS B0601 (1994) is preferably 1 to 100 μm, and a maximum height (Ry) measured in conformity with JIS B0601 (1994) is preferably 2 μm or more. A more preferable range of the average interval (S) is 2 to 50 μm, and even more preferably 5 to 20 μm. Besides, a more preferable range of the maximum height (Ry) is 3 to 9 μm, and even more preferably 4 to 6 μm.

One preferable example of the matte surface-like concavity/convexity structure is, for example, a crease-like concavity/convexity structure formed by a later-described method. From the viewpoint of achieving the excellent antireflection effect, this concavity/convexity structure is preferably a structure in which the roughness of the surface of the light blocking film 20 formed with the concavity/convexity structure is 0.1 μm or more in terms of the arithmetic average roughness (Ra) measured by the atomic force microscope (AFM) in conformity with HS B0601 (1994), more preferably 0.15 to 10 μm, even more preferably 0.23 to 10 μm. Besides, the average interval (S) between local peaks measured by the above method is preferably 5 to 100 μm, more preferably 5 to 50 μm, and even more preferably 5 to 20 μm.

The light blocking film 20 can be formed, for example, by the following method.

First, a light curing resin having a light blocking property is applied to the entire surface of the ultraviolet and infrared light reflective film 12 of the filter main body 10, and dried to form into a light curing resin coated layer. As a coating method of the light curing resin, a spin coating method, a bar coating method, a dip coating method, a casting method, a spray coating method, a bead coating method, a wire bar coating method, a blade coating method, a roller coating method, a curtain coating method, a slit die coating method, a gravure coating method, a slit reverse coating method, a micro gravure method, a comma coating method and so on can be used. The coating may be performed dividedly in a plurality of times. Further, prior to the coating, a coupling treatment using hexamethyldisilazane (HMDS) or the like may be performed on the surface of the ultraviolet and infrared light reflective film 12 to enhance the adhesiveness to the ultraviolet and infrared light reflective film 12.

Then, an opening is made in the light curing resin coated layer at a position corresponding to the light blocking film 20, and light is applied via a photomask provided with a concavity/convexity in a shape corresponding to the concavity/convexity 22 on an inner peripheral surface of the opening. As for the applied light, for example, when the light curing resin is cured with light in the ultraviolet wavelength region, light containing at least such light in the ultraviolet wavelength region is applied. This cures the light curing resin at a portion irradiated with the light.

Then, the light curing resin at an un-irradiated portion is selectively removed by development. For the development, wet development, dry development or the like may be used. The wet development can be performed using a developing solution corresponding to the kind of the light curing resin, such as an alkaline solution, an aqueous developing solution, an organic solvent or the like by a known method such as a dip method, a spray method, brushing or slapping.

Then, to form the thin part 23, a required portion of the cured light curing resin is heated and thereby melted. The heated and melted light curing resin changes in cross-sectional shape in the thickness direction due to the surface tension to form into the thin part 23. This forms the light blocking film 20 provided with the concavity/convexity 22 and the thin part 23. After the formation of the thin part 23, the light blocking film 20 may be further cured as necessary by being heated or irradiated with light.

In the case of forming the matte surface-like concavity/convexity structure on the surface of the light blocking film 20, a radiation is applied to the light blocking film 20 after the development to further cure only a surface layer portion of the light blocking film 20. A radiation with a wavelength to be greatly absorbed by the light blocking film 20 is used. As a preferable radiation, ultraviolet light with a wavelength of 170 nm to 270 nm, for example, ultraviolet light with a wavelength of 184 nm to 254 nm can be exemplified. Thereafter, the light blocking film 20 is heated, for example, at 50 to 300° C., whereby a light blocking film having the matte surface-like concavity/convexity structure on its surface is formed.

The light blocking film 20 provided with the concavity/convexity 22 and the thin part 23 can be formed also by the following method.

An opening is made in the light curing resin coated layer formed similarly to the above at a position corresponding to the light blocking film 20, and a first round of light irradiation is performed via a first photomask provided with a concavity/convexity in a shape corresponding to the concavity/convexity 22 at an inner peripheral surface of the opening. Further, a second round of light irradiation is performed via a second photomask provided with an opening smaller by the width w of the thin part 23 than the inner peripheral surface of the opening. The light curing resin is not completely cured by the first round of light irradiation but is completely cured by the second round of light irradiation. Thereafter, when the light curing resin at an un-irradiated portion is selectively removed by development, a portion subjected only to the first round of light irradiation is insufficient in curing with the light and is thus smaller in thickness than a portion subjected to the second round of light irradiation, and thereby can form into the thin part 23. Though the two photomasks are used in this example, a thin part 23 gradually decreasing in thickness toward the edge can be formed by repeating light irradiation using three or more photomasks decreasing in width of the opening little by little.

A thin part 23 gradually decreasing in thickness toward the edge stepwise or continuously can be formed by one round of light irradiation, by using, as the photomask, a so-called gray mask that is not composed of portions having binary transmittances of light transmission and light blocking but a portion for forming the thin part 23 having light transmittance changing stepwise or continuously.

As described above, the light blocking film 20 may be provided with only one of the concavity/convexity 22 and the thin part 23. Accordingly, the light blocking film 20 having only the thin part 23 can be formed using a photomask having no concavity/convexity on its inner peripheral surface. For the light blocking film 20 having only the concavity/convexity 22, the process of forming the thin part 23 can be omitted.

The light blocking film 20 can be formed also by a printing method, a transfer method, an ink-jet method or the like. Examples of the printing method include screen printing, flexographic printing, relief printing methods and so on. These methods have advantages that a light blocking film in a desired shape can be formed even without performing exposure using a photomask and development. For forming the concavity/convexity 22, a screen plate formed with a desired concavity/convexity can also be used in the case of the screen printing. However, it is preferable to use a screen plate to which a mesh is bonded as the plate because the amount of ink (resin) to be printed can be slightly changed between at an opening portion and at a mesh portion of the mesh so that a desired concavity/convexity can be created by adjusting printing conditions without the need of a high-precision plate.

Further, the thin part 23 can be formed by adjusting printing conditions, viscosity of ink, wettability with a coated surface, surface tension, ink temperature and so on.

Hereinafter, an example of the method of forming the thin part 23 by the screen printing.

A first round of printing and curing of a light blocking resin is performed via a first screen plate opened at a position corresponding to the light blocking film 20. Then, a second round of printing and curing of the light curing resin is performed via a second screen plate provided with an opening smaller by the width w of the thin part 23 than the inner peripheral surface of the opening. Thus, the light blocking film 20 provided with the thin part 23 at the inner edge can be formed.

Further, the thin part 23 can be formed also by adjusting a clearance between the screen plate and the filter main body 10 during printing to be slightly large, or by adjusting pressure and angle of a squeegee.

Furthermore, provision of a concavity/convexity with finer pitches on the screen plate at a portion corresponding to the inner peripheral surface in addition to the concavity/convexity 22 formed on the inner peripheral surface makes the light blocking resin difficult to get out of a portion having the concavity/convexity with finer pitches with respect to the opening of the screen plate during printing to thereby enable a reduction in thickness of the light blocking resin, whereby the thin part 23 can be formed.

The thickness of the light blocking film 20 is preferably 0.1 to 400 μm. A thickness less than 0.1 μm may cause a possibility to fail to achieve sufficient light blocking characteristics and makes control of the thickness of the thin part difficult. On the other hand, a thickness exceeding 400 μm increases the thickness of the whole filter and makes reduction in size and weight of the imaging apparatus difficult. Further, distortion becomes more likely to occur due to curing shrinkage when the resin is cured, and the control of the shape of a concavity/convexity to be formed on the inner peripheral surface becomes difficult. The thickness of the light blocking film 20 is more preferably 0.2 to 100 μm, and even more preferably 0.5 to 10 μm.

From the viewpoint of controlling the shape of the concavity/convexity to be formed on the inner peripheral surface, the thickness of the light blocking film 20 is preferably 40 times or less the smaller one of the maximum height d and the minimum pitch of the concavity/convexity. It is more preferably 5 times or less, even more preferably 2 times or less, and most preferably ½ times or less.

Figure 7:
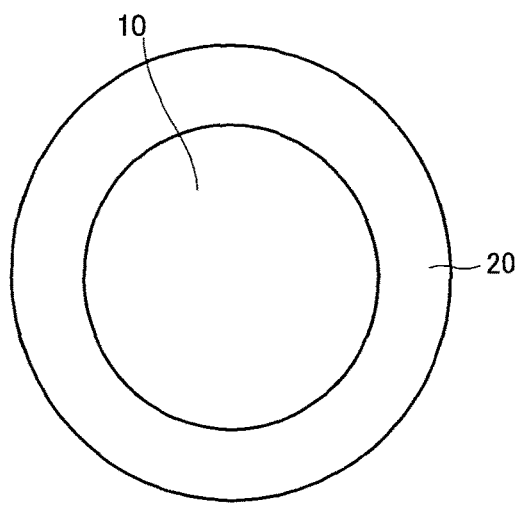
FIG. 7 is a graph illustrating a modification example of the optical filter in one embodiment of the present invention.
Figure 8:
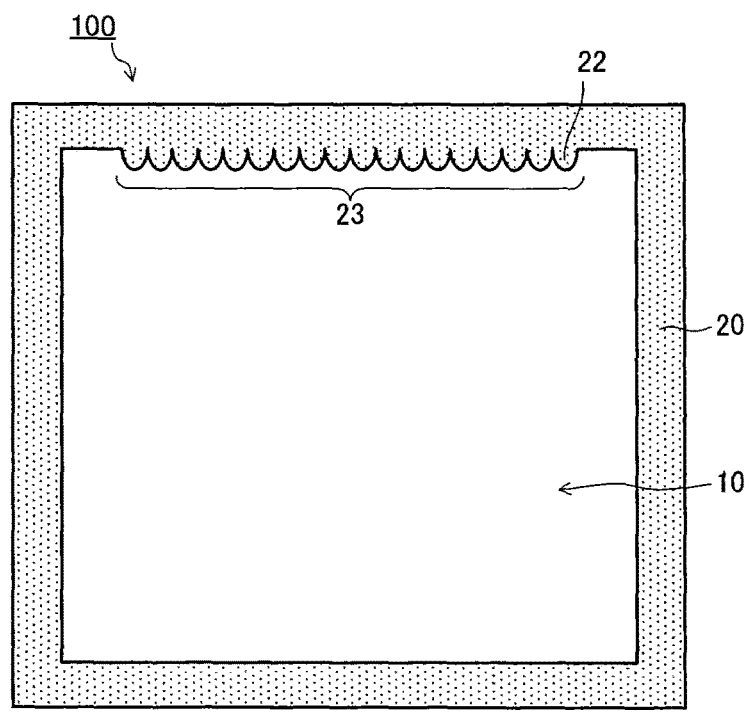
FIG. 8 is a graph illustrating a modification example of the optical filter in one embodiment of the present invention.

In this embodiment, the shape in planar view of the filter main body 10 is rectangular as illustrated in FIG. 1, and the light blocking film 20 is provided in a rectangular frame shape along the outer periphery of the filter main body 10. The filter main body 10 may be, for example, circular as illustrated in FIG. 7 and is not particularly limited. Note that the illustration of the concavity/convexity on the inner peripheral surface of the light blocking film 20 is omitted in FIG. 7. Besides, the concavity/convexity 22 is formed at the entire inner peripheral surface of the light blocking film 20 in the near-infrared cut filter illustrated in FIG. 1, but may be provided at a part thereof as illustrated in FIG. 8 or may be provided at a plurality of positions at intervals though illustration thereof is omitted. Furthermore, the concavity/convexity 22 and the thin part 23 may be individually formed at different positions, or the positions where the concavity/convexity 22 and the thin part 23 are formed and the positions where one of the concavity/convexity 22 and the thin part 23 is formed may be located in a mixed manner.

From the viewpoint of the light diffraction suppressing effect, both of the concavity/convexity 22 and the thin part 23 are preferably formed over a length of 10% or more of the inner peripheral surface (a total length when provided at intervals), more preferably 20% or more, and even more preferably 40% or more. Besides, when the shape of the light blocking film 20 is a rectangular frame shape as illustrated in FIG. 8, they are preferably provided at at least one side where stray light becomes a problem, and more preferably provided at the entire circumference as illustrated in FIG. 1.

The transparent substrate 11, the ultraviolet and infrared light reflective film 12, and the antireflection film 13 constituting the filter main body 10 of the near-infrared cut filter 100 in this embodiment will be described in detail.

The shape of the transparent substrate 11 is not particularly limited as long as it transmits light in the visible wavelength region, and examples thereof include a plate shape, a film shape, a block shape, a lens shape and so on. Further, the transparent substrate 11 may be made of infrared absorbing glass or a resin containing an infrared absorbent.

Examples of the material of the transparent substrate 11 include crystals such as glass, crystalline quartz, lithium niobate, and sapphire; polyester resins such as polyethylene terephthalate (PET) and polybutylene terephthalate (PBT); polyolefin resins such as polyethylene, polypropylene, and ethylene-vinyl acetate copolymer; a norbornene resin; acrylic resins such as polyacrylate, and polymethyl methacrylate; a urethane resin; a vinyl chloride resin; a fluorocarbon resin; a polycarbonate resin; a polyvinyl butyral resin; a polyvinyl alcohol resin and so on. These materials may have absorption characteristics for at least one of the ultraviolet wavelength region and the infrared wavelength region.

As the glass, one appropriately selected from among materials transparent in the visible wavelength region can be used. For example, borosilicate glass is preferable because it is easy to process and suppress occurrence of scratch, foreign substance and the like on the optical surface, and glass containing no alkaline component is preferable because it is excellent in adhesiveness, weather resistance and so on.

Further, as the glass, light absorbing glass having absorption in the infrared wavelength region made by adding CuO or the like to fluophosphate-based glass or phosphate-based glass can also be used. In particular, the fluophosphate-based glass or phosphate-based glass having CuO added thereto has a high transmittance with respect to the light in the visible wavelength region and can impart an excellent near-infrared cutting function because CuO sufficiently absorbs the light in the infrared wavelength region.

As a concrete example of the fluophosphate-based glass containing CuO, the one containing 100 parts by mass of fluophosphate-based glass composed of, by mass %, 46 to 70% $P_2O_5$, 0 to 25% $MgF_2$, 0 to 25% $CaF_2$, 0 to 25% $SrF_2$, 0 to 20% LiF, 0 to 10% NaF, 0 to 10% KF where a total of LiF, NaF, KF is 1 to 30%, 0.2 to 20% $AlF_3$, 2 to 15% $ZnF_2$ (where up to 50% of a total sum of fluoride can be substituted by oxide), and 0.1 to 5 parts by mass, preferably 0.3 to 2 parts by mass of CuO can be exemplified. Examples of commercially available product include NF-50 glass (brand name, manufactured by Asahi Glass Co., Ltd.) or the like.

As a concrete example of the phosphate-based glass containing CuO, the one containing 100 parts by mass of phosphate-based glass composed of, by mass %, 70 to 85% $P_2O_5$, 8 to 17% $Al_2O_3$, 1 to 10% $B_2O_3$, 0 to 3% $Li_2O$, 0 to 5% $Na_2O$, 0 to 5% $K_2O$, 0.1 to 5% $Li_2O+Na_2O+K_2O$, 0 to 3% $SiO_2$, and 0.1 to 5 parts by mass, preferably 0.3 to 2 parts by mass of CuO can be exemplified.

The thickness of the transparent substrate 11 is not particularly limited, but is preferably in a range of 0.1 to 3 mm, and more preferably in a range of 0.1 to 1 mm from the viewpoint of reducing the size and weight.

The ultraviolet and infrared light reflective film 12 has a function of accelerating formation of the light blocking film 20 as has been described, and also has a function of imparting or enhancing the near-infrared cut filter function. The ultraviolet and infrared light reflective film 12 is composed of a dielectric multilayered film made by alternately stacking a low refractive index dielectric layer and a high refractive index dielectric layer by a sputtering method, a vacuum deposition method or the like.

As the material of the low refractive index dielectric layer, a material having a refractive index of 1.6 or less, preferably 1.2 to 1.6 may be used. Specifically, silica ($SiO_2$), aluminum, lanthanum fluoride, magnesium fluoride, sodium aluminum hexafluoride or the like may be used. As the material of the high refractive index dielectric layer, a material having a refractive index of 1.7 or more, preferably 1.7 to 2.5 may be used. Specifically, titania ($TiO_2$), zirconia, tantalum pentoxide, niobium pentoxide, lanthanum oxide, yttria, zinc oxide, zinc sulfide or the like may be used. The refractive index is a refractive index with respect to light with a wavelength of 550 nm.

The dielectric multilayered film can also be formed by an ion beam method, an ion plating method, a CVD method or the like other than the above-described sputtering method or the vacuum deposition method. The sputtering method and the ion plating method perform so-called plasma atmospheric treatment and therefore can improve the adhesiveness to the transparent substrate 11.

The antireflection film 13 has a function of preventing reflection of light incident on the near-infrared cut filter 100 to thereby improve the transmittance so as to efficiently utilize the incident light, and can be formed by conventionally known material and method. Specifically, the antireflection film 13 may be composed of a film of one or more layers of silica, titania, tantalum pentoxide, magnesium fluoride, zirconia, alumina or the like formed by a sputtering method, a vacuum deposition method, an ion beam method, an ion plating method, a CVD method or the like, or silicate, silicone, methacrylate fluoride or the like formed by a sol-gel method, a coating method or the like. The thickness of the antireflection film 13 may be usually in a range of 100 to 600 nm.

In the present invention, on the principal surface of the transparent substrate 11 on the side opposite to the principal surface on which the ultraviolet and infrared light reflective film 12 is formed, a second ultraviolet and infrared light reflective film composed of a dielectric multilayered film that reflects light in the ultraviolet wavelength region and the infrared wavelength region may be provided in place of the antireflection film 13 or between the antireflection film 13 and the transparent substrate 11. Further, a second antireflection film may be provided in place of the ultraviolet and infrared light reflective film 12 or on the ultraviolet and infrared light reflective film 12.

Figure 9:
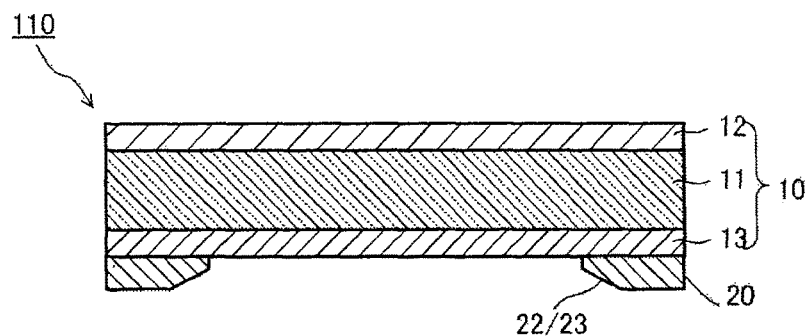
FIG. 9 is a graph illustrating a modification example of the optical filter in one embodiment of the present invention.

The light blocking film 20 may be formed on the principal surface of the filter main body 10 on the antireflection film 13 side as in a near-infrared cut filter 110 illustrated in FIG. 9.

Figure 10:
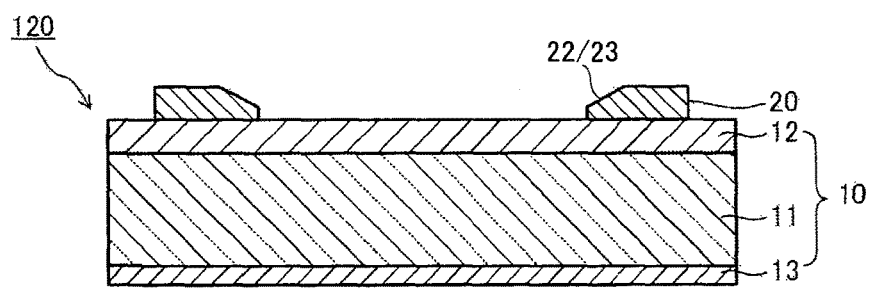
FIG. 10 is a graph illustrating a modification example of the optical filter in one embodiment of the present invention.
Figure 11:
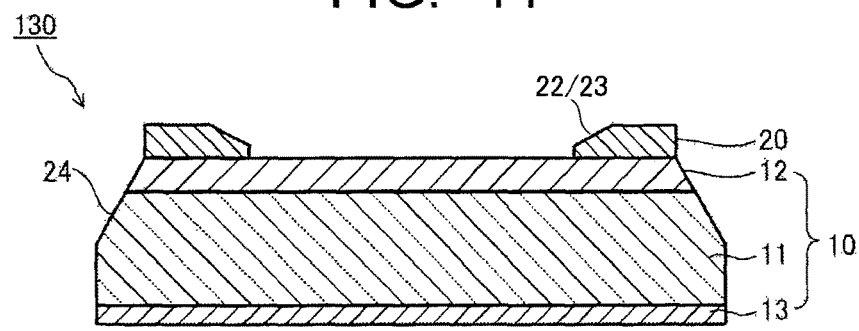
FIG. 11 is a graph illustrating a modification example of the optical filter in one embodiment of the present invention.

The light blocking film 20 may have an outer edge located on the inside of an outer edge of the filter main body 10 as in a near-infrared cut filter 120 illustrated in FIG. 10. In this case, it is preferable to form a chamfer 24 at an outer peripheral portion of the filter main body 10 as in a near-infrared cut filter 130 illustrated in FIG. 11. Forming the chamfer 24 makes it possible to suppress stray light generated by reflection of the light incident on an outer edge surface of the exposed filter main body 10.

Figure 12:
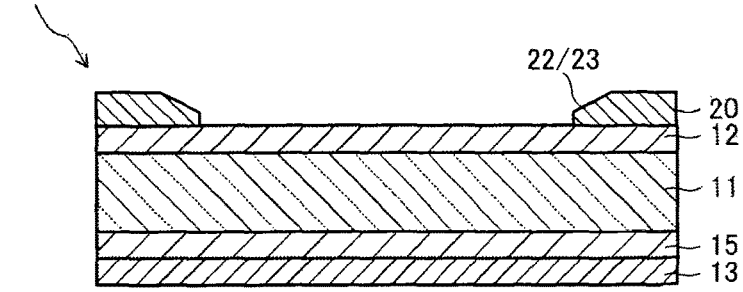
FIG. 12 is a graph illustrating a modification example of the optical filter in one embodiment of the present invention.

An infrared light absorbing film 15 may be provided between the transparent substrate 11 and the antireflection film 13 as in a near-infrared cut filter 140 illustrated in FIG. 12. The infrared light absorbing film 15 may be provided between the transparent substrate 11 and the ultraviolet and infrared light reflective film 12.

The infrared light absorbing film 15 may be made of a transparent resin containing an infrared absorbent absorbing light in the infrared wavelength region.

The transparent resin only needs to transmit light in the visible wavelength region, and its examples include an acrylic resin, a styrene resin, an ABS resin, an AS resin, a polycarbonate resin, a polyolefin resin, a polyvinyl chloride resin, an acetate-based resin, a cellulose-based resin, a polyester resin, an allyl ester resin, a polyimide resin, a polyamide resin, a polyimide ether resin, a polyamide-imide resin, an epoxy resin, a urethane resin, a urea resin and so on.

Examples of the infrared absorbent absorbing light in the infrared wavelength region include inorganic fine particles of ITO ($In_2O_3$—$TiO_2$-based), ATO (ZnO—$TiO_2$-based), lanthanum boride and so on, and organic dyes such as a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound, an anthraquinone-based compound and an indophenol-based compound.

Other than the above, as the inorganic fine particles, those composed of crystallites of oxides each containing at least Cu and/or P and having a number average aggregate particle size of 5 to 200 nm, preferably, those composed of crystallites of compounds each expressed by the following Expression (1) and having a number average aggregate particle size of 5 to 200 nm can be used.

$$A_{1/n}CuPO_4 \tag{1}$$

wherein A is at least one selected from a group consisting of alkaline metals (Li, Na, K, Rb, Cs), alkaline earth metals (Mg, Ca, Sr, Ba) and $NH_4$, and a subscript n is 1 when A is an alkaline metal or $NH_4$, and 2 when A is an alkaline earth metal.

The inorganic particles composed of the crystallites are preferable since they can maintain the infrared absorbing characteristics owing to the crystal structure and can be contained at a high concentration in the infrared light absorbing film 15 because the crystallites are fine particles to increase the absorptivity per unit length.

The inorganic fine particles may be subjected to surface treatment by a known method for the purpose of improving the weather resistance, acid resistance, water resistance and so on and improving compatibility with a binder resin by surface modification.

Further, as the organic dye, a dye can be used which has a maximum absorption peak having a peak wavelength of 695±1 nm and a full width at half maximum of 35±5 nm in an absorption spectrum of light in a wavelength region of 400 to 1000 nm measured by being dissolved in acetone. Such dye is preferable because it steeply changes in absorbance between wavelengths near 630 nm and 700 nm required for the near-infrared cut filter.

One kind of infrared absorbent may be used alone or two or more kinds may be used by mixture.

The transparent resin may contain a color tone correcting dye, a leveling agent, an antistatic agent, a heat stabilizer, an antioxidant, a dispersing agent, a flame retardant, a lubricant, a plasticizer and so on in a range not inhibiting the effect of the present invention in addition to the infrared absorbent.

The infrared light absorbing film 15 can be formed, for example, by preparing a painting liquid by dispersing or dissolving the transparent resin, the infrared absorbent, and other additives to be mixed as necessary into a dispersion medium or a solvent, and then painting and drying the mixture. The painting and drying can be performed dividedly in a plurality of times. In this event, a plurality of painting liquids different in components may be prepared and painted and dried in sequence. More specifically, for example, a painting liquid containing the above-described organic dye and a painting liquid containing ITO particles may be individually prepared, and then they may be painted and dried in sequence.

Examples of the dispersion medium or solvent include water, alcohol, ketone, ether, ester, aldehyde, amine, aliphatic hydrocarbon, alicyclic hydrocarbon, aromatic hydrocarbon and so on. One kind of them may be used alone or two or more kinds may be used by mixture. To the painting liquid, a dispersing agent may be mixed as necessary.

For the preparation of the painting liquid, a stirring apparatus such as a planetary centrifugal mixer, a bead mill, a satellite mill, an ultrasonic homogenizer or the like can be used. It is preferable to sufficiently perform stirring so as to secure high transparency. The stirring may be performed continuously or intermittently.

For painting the painting liquid, a spin coating method, a bar coating method, a dip coating method, a casting method, a spray coating method, a bead coating method, a wire bar coating method, a blade coating method, a roller coating method, a curtain coating method, a slit die coating method, a gravure coating method, a slit reverse coating method, a micro gravure method, a comma coating method and so on can be used.

The thickness of the infrared light absorbing film 15 is preferably in a range of 0.01 to 400 μm, and more preferably in a range of 0.1 to 50 µm. A thickness less than 0.01 µm may fail to achieve predetermined absorptivity, and a thickness exceeding 400 µm may cause uneven drying during drying.

The near-infrared cut filter 130 including the infrared light absorbing film 15 can provide an excellent near-infrared cutting function.

Figure 13:
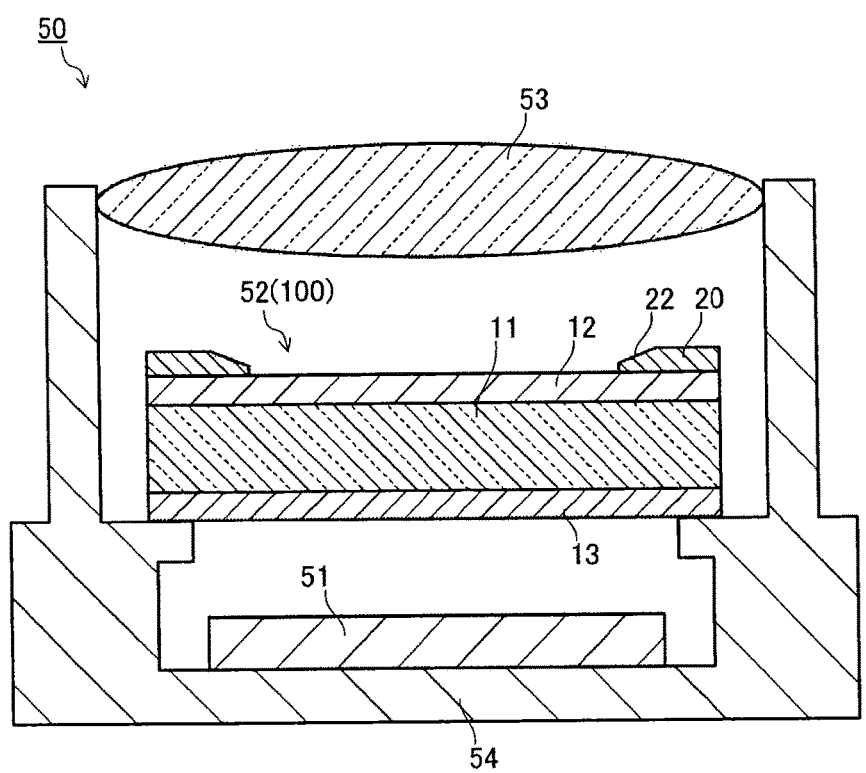
FIG. 13 is a cross-sectional view schematically illustrating an example of an imaging apparatus using the optical filter in one embodiment of the present invention.

FIG. 13 is a cross-sectional view schematically illustrating an imaging apparatus 50 using the near-infrared cut filter in this embodiment.

As illustrated in FIG. 13, the imaging apparatus 50 has a solid-state image sensing device 51, an optical filter 52, a lens 53, and a casing 54 that holds and fixes them.

The solid-state image sensing device 51, the optical filter 52, and the lens 53 are arranged along an optical axis x, and the optical filter 52 is arranged between the solid-state image sensing device 51 and the lens 53. The solid-state image sensing device 51 is an electronic component that converts light incident thereon after passing through the lens 53 and the optical filter 52 into an electric signal, and is, for example, a CCD, a CMOS or the like. In this embodiment, the near-infrared cut filter 100 illustrated in FIG. 1 is used as the optical filter 52, and is arranged so that the light blocking film 20 is located on the lens 53 side.

The near-infrared cut filter 100 may be arranged so that the light blocking film 20 is located on the solid-state image sensing device 51 side. Besides, the near-infrared cut filters illustrated in FIG. 9, FIG. 10, FIG. 11, FIG. 12 and the like can be used in place of the near-infrared cut filter 100 as the optical filter 52. Even when these near-infrared cut filters are used, they may be arranged so that the light blocking film 20 is located on the lens 53 side or may be arranged so that the light blocking film 20 is located on the solid-state image sensing device 51 side.

In the imaging apparatus 50, the light incident from the subject side passes through the lens 53 and the optical filter 52 (near-infrared cut filter 100) and is incident on the solid-state image sensing device 51. The solid-state image sensing device 51 converts the incident light into an electric signal and outputs it as an image signal. The incident light passes through the near-infrared cut filter 100 provided with the light blocking film 20 and is thereby adjusted to have an adequate light amount, and is then received by the solid-state image sensing device 51 as light with near-infrared rays sufficiently blocked.

In the imaging apparatus 50, the light blocking film 20 provided with the concavity/convexity 22 and the thin part 23 is provided integrally with the near-infrared cut filter 100, thereby suppressing stray light caused by diffraction of light at the inner edge of the conventional light blocking film so as to obtain an excellent image without noise.

It is preferable to arrange the near-infrared cut filter 100 such that the distance between the light blocking film 20 and the light receiving plane of the image sensing device is 0.02 to 5 mm from the viewpoint of the diffraction suppressing effect, constraints on the manufacturing technique and so on.

In this example, the imaging apparatus 50 has one lens arranged, but may include a plurality of lenses, or may include a cover glass or the like for protecting the solid-state image sensing device. Further, the position of the optical filter is not limited to a position between the lens and the solid-state image sensing device, but may be arranged, for example, on the side closer to the subject than is the lens or, when a plurality of lenses are arranged, may be arranged between the lenses.

The above-described embodiment is an example that the optical filter is a filter having the near-infrared cutting function, but may be a filter having, not limited to the near-infrared cutting function, but a function of a low-pass filter, an ND filter, a color tone filter, an optical amplifying filter or the like.

The present invention is not limited by the described contents of the above-described embodiment, but may be variously modified without departing from the scope of the present invention.

EXAMPLES

Next, the present invention will be described using Examples, but the present invention is not limited by the Examples at all.

Example 1

A silica ($SiO_2$; refractive index of 1.45 (wavelength of 550 nm)) layer and a titania ($TiO_2$; refractive index of 2.32 (wavelength of 550 nm)) layer were alternately stacked by the vacuum deposition method on one surface of infrared absorbing glass (NF-50 glass manufactured by Asahi Glass Co., Ltd.) in a square sheet of 40 mm×40 mm×0.3 mm to form a dielectric multilayered film (34 layers). Further, an antireflection film was formed on the other surface of the infrared absorbing glass.

To the entire surface of the dielectric multilayered film, a light blocking ultraviolet curing acrylate-based resin was applied by the spin coating method to a thickness of 1.2 µm and heated, and then ultraviolet rays of 100 mJ/cm$^2$ were applied by a high-pressure mercury lamp to the surface of the resin via a photomask having an irregular concavity/convexity on its inner peripheral surface of an opening to cure it. Thereafter, an unexposed portion was removed by a developing solution, and then heating was performed to manufacture a near-infrared cut filter.

On an inner peripheral surface of a light blocking film of the obtained near-infrared cut filter, an irregular concavity/convexity was formed. Further, when the surface of the light blocking film was observed under an atomic force microscope (AMF), a crease-like fine concavity/convexity structure with an average interval (S) between local peaks of 10 µm was formed and a surface roughness of the light blocking film was 180 nm in terms of an arithmetic average roughness (Ra).

Example 2

A silica ($SiO_2$; refractive index of 1.45 (wavelength of 550 nm)) layer and a titania ($TiO_2$; refractive index of 2.32 (wavelength of 550 nm)) layer were alternately stacked by the vacuum deposition method on one surface of infrared absorbing glass (NF-50 glass manufactured by Asahi Glass Co., Ltd.) similarly to Example 1 to form a dielectric multilayered film (34 layers). Further, three-layer antireflection film was formed on the other surface of the infrared absorbing glass.

To the surface of the dielectric multilayered film, a coating solution prepared by adding and uniformly mixing light blocking resin ink (containing black coloring pigment), silica fine particles (average particle diameter (D50) of 4.7 µm), and a solvent was applied using a first screen plate having an irregular concavity/convexity on an inner peripheral surface of an opening and heated to form into a first coating film. Then, the coating solution was applied again onto the first coating film using a second screen plate having an opening smaller than that of the first screen plate and heated to form into a second coating film, thereby manufacturing a near-infrared cut filter having a light blocking film with a thickness of 7 μm composed of the first and second coating films.

Figure 14A:
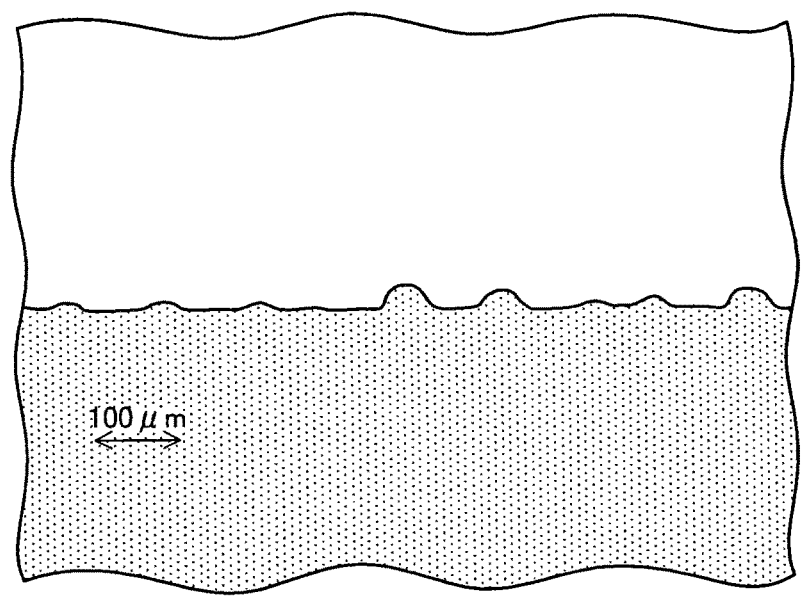
FIG. 14A is an imitative view of a photograph of the light blocking film formed in Example imaged by an optical microscope.
Figure 14B:
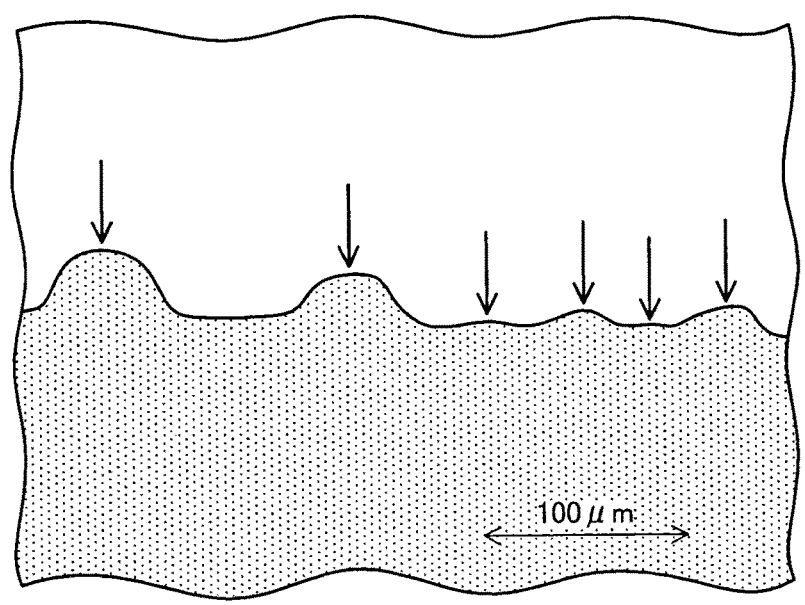
FIG. 14B is an imitative view of a macrophotography of the photograph in FIG. 14A.

On an inner peripheral surface of a light blocking film of the obtained near-infrared cut filter, an irregular concavity/convexity as illustrated in FIG. 14A, FIG. 14B were formed. FIG. 14A is an imitative view of a photograph of the light blocking film imaged by an optical microscope, and FIG. 14B is an imitative view of a microphotography of the photograph. Arrows in FIG. 14B indicate convexities formed on the inner peripheral surface of the light blocking film.

Figure 15:
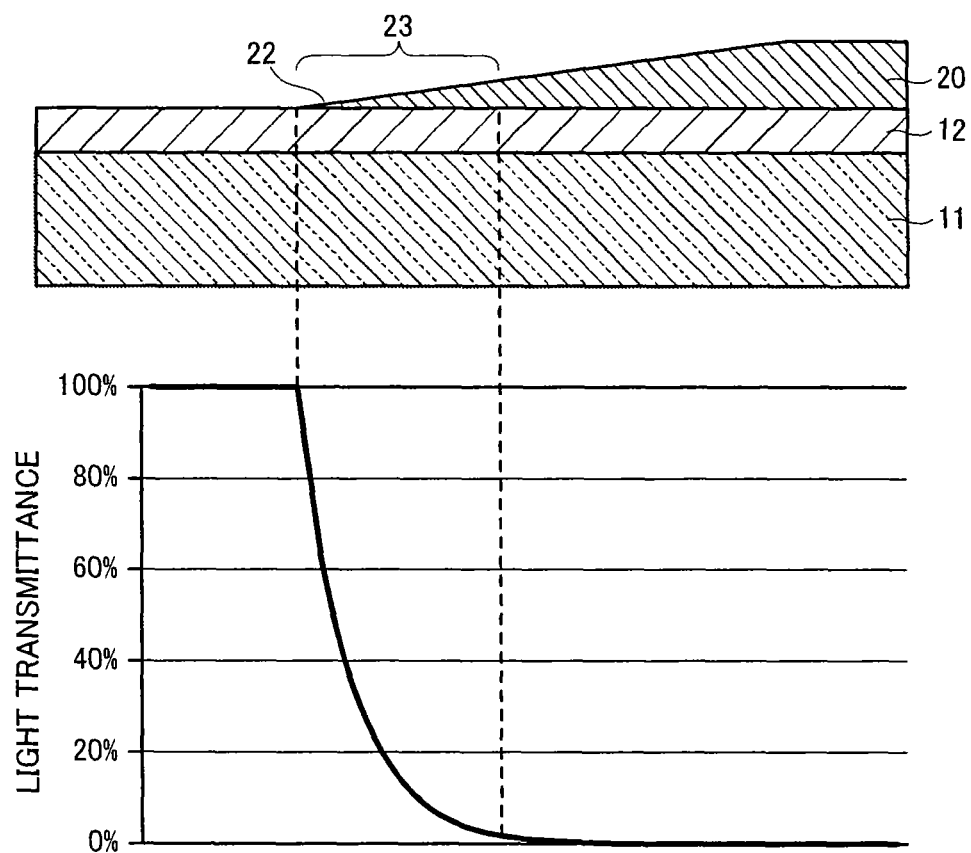
FIG. 15 is a chart illustrating a transmittance distribution of the light blocking film formed in Example together with measurement positions.

Further, the relationship between the thickness of the light blocking film and the light transmittance was investigated using a spectrophotometer (manufactured by Hitachi, Ltd., Hitachi Spectrophotometer U-4100), and the relationship between the thickness and the position of an inner edge of the light blocking film and its surroundings was investigated, and after the position and the light transmittance of the light blocking film was investigated from the two relationships, a result illustrated in FIG. 15 was obtained. As is clear from the graph in FIG. 15, a thin part 23 having a width of 15 μm and a transmittance of 0.5% or more was formed at the inner edge of the light blocking film.

Further, when the surface of the light blocking film was observed under the atomic force microscope (AMF), a matte surface-like fine concavity/convexity structure was formed, and as for its surface roughness, the light blocking film formed of the material made by adding 2 parts by mass of the silica fine particles (2 mass % to the light blocking resin ink) had an arithmetic average roughness (Ra) of 0.43 μm, a maximum height (Ry) of 3.63 μm, and an average interval (S) between local peaks of 30 μm, and the light blocking film formed of the material made by adding 4 parts by mass of the silica fine particles (4 mass % to the light blocking resin ink) had an arithmetic average roughness (Ra) of 0.4 μm, a maximum height (Ry) of 3.5 μm, and an average interval (S) between local peaks of 5.0 μm.

Further, light with a wavelength of 633 nm was applied to the near-infrared cut filter, and the light amount distribution of the transmitted light was investigated using a beam profiler (manufactured by Ophir Optronics Solution Ltd.). For comparison, measurement was also performed on a conventional type near-infrared cut filter manufactured similarly to Example 2 except that the concavity/convexity and the thin part were not formed at the light blocking film. Results are illustrated in FIG. 16.

Figure 16:
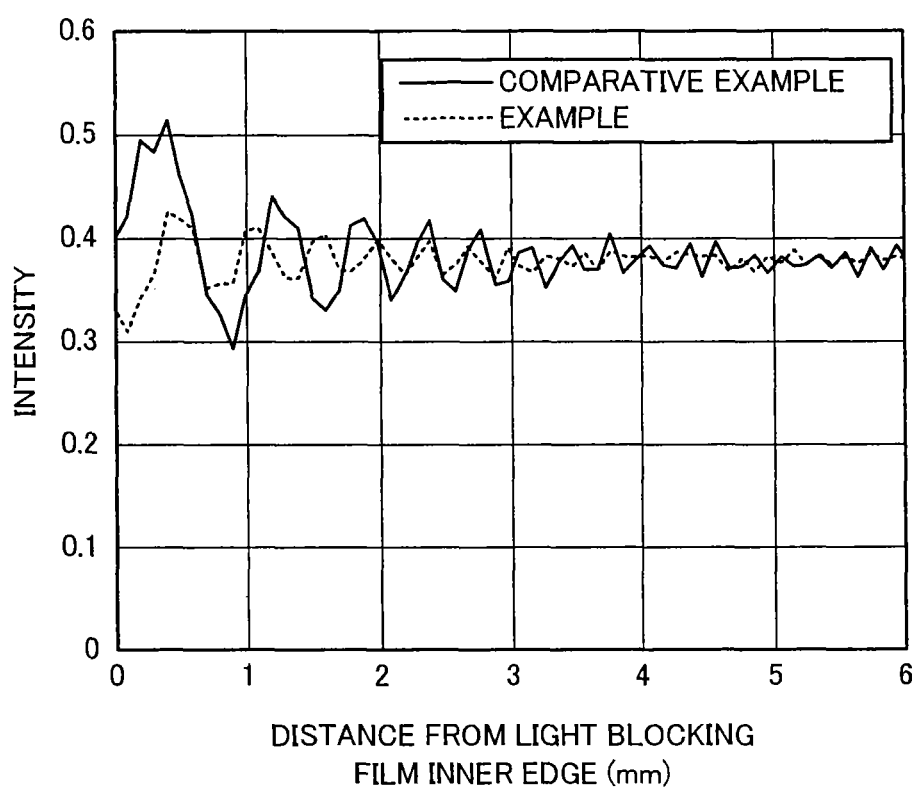
FIG. 16 is a chart illustrating an example of a transmitted light amount (intensity) distribution measured about the light blocking film formed in Example.

As is clear from the graph in FIG. 16, the transmitted light intensity of Example was obviously reduced in light intensity amplitude as compared with Comparative Example at the inner edge of the light blocking film and near there, so that forming the concavity/convexity and the thin part at the light blocking film makes it possible to prevent image degradation due to diffraction.

An optical filter of the present invention is excellent in productivity and economic efficiency and can be integrally provided with a light blocking film having a light diffraction suppressing effect at an inner edge, and is thus useful for an imaging apparatus such as a miniature camera installed in information devices such as a digital still camera, a digital video camera, a cellular phone, a notebook personal computer and a PDA.

What is claimed is:

1. An optical filter comprising:
   an optical filter main body having a planar form and being transmissive to an incident light; and
   a light blocking film having a frame shape, and being integrally formed on at least one surface of the optical filter main body along an outer periphery of the optical filter main body,
   wherein the optical filter satisfies at least one of condition (1) and condition (2), (1) at least a part of an inner periphery of the frame shape of the light blocking film is constituted by a reference line and irregular concavities and convexities formed on the reference line in a plane of the planar form of the optical filter main body, and (2) the light blocking film has a thin portion which is thinner than a portion other than the thin portion, along at least a part of the inner periphery of the frame shape of the light blocking film.

2. The optical filter according to claim 1,
   wherein distances between the reference line and peaks of the convexities and distances between the reference line and bottoms of the concavities are in a range of from 0.4 to 50 μm in the plane of the planar form of the optical filter main body.

3. The optical filter according to claim 1,
   wherein a light transmittance of the thin portion is 0.5% or more.

4. The optical filter according to claim 2,
   wherein a light transmittance of the thin portion is 0.5% or more.

5. The optical filter according to claim 1,
   wherein the thin portion has a belt shape and a width of the belt shape of the thin portion is from 0.4 to 50 μm.

6. The optical filter according to claim 2,
   wherein the thin portion has a belt shape and a width of the belt shape of the thin portion is from is 0.4 to 50 μm.

7. The optical filter according to claim 3,
   wherein the thin portion has a belt shape and a width of the belt shape of the thin portion is from 0.4 to 50 μm.

8. The optical filter according to claim 4,
   wherein the thin portion has a belt shape and a width of the belt shape of the thin portion is from is 0.4 to 50 μm.

9. The optical filter according to claim 1,
   wherein the thin portion has an inclined surface such that the thin portion gradually decreases in thickness toward the inner periphery of the frame shape of the light blocking film.

10. The optical filter according to claim 1, wherein the optical filter cuts a near-infrared light.

11. The optical filter according to claim 1,
    wherein the optical filter main body comprises infrared absorbing glass that absorbs light in an infrared wavelength region.

12. The optical filter according to claim 1,
    wherein the optical filter main body comprises an infrared absorbent that absorbs light in an infrared wavelength region.

13. The optical filter according to claim 1, wherein a light transmittance of the portion other than the thin portion is less than 0.5%.

14. The optical filter according to claim 1, wherein both condition (1) and condition (2) are satisfied.

15. The optical filter according to claim 14, wherein distances between the reference line and peaks of the convexities and distances between the reference line and bottoms of the concavities are in a range of from 0.4 to 50 μm in the plane of the planar form of the optical filter main body.

16. The optical filter according to claim 15, wherein a light transmittance of the thin portion is 0.5% or more and a light transmittance of the portion other than the thin portion is less than 0.5%.

17. The optical filter according to claim 1, wherein a value of $|\Delta d1-\Delta d2|/d$ is 0.05 or more, where provided that a height of a convexity is a distance between the reference line and a peak of the convexity and a depth of a concavity is a distance between the reference line and a bottom of the concavity, $\Delta d1$ is a peak difference which is a difference between heights of two convexities which are adjacent to each other, $\Delta d2$ is a peak difference adjacent to $\Delta d1$, and d is a sum of a maximum height of convexities and a maximum depth of concavities.

18. The optical filter according to claim 1, wherein the light blocking film has a matte surface.

19. The optical filter according to claim 18, wherein an arithmetic average roughness (Ra) of the matte surface of the light blocking film is 0.1 μm or more.

20. The optical filter according to claim 1, wherein the light blocking film comprises carbon black, titanium black or both.

\* \* \* \* \*